United States Patent
Chen et al.

(10) Patent No.: US 9,614,211 B2
(45) Date of Patent: Apr. 4, 2017

(54) LITHIUM ION BATTERY HAVING DESIRABLE SAFETY PERFORMANCE

(71) Applicants: Ningde Amperex Technology Limited, NingDe (CN); Dongguan Amperex Technology Limited, Dongguan (CN)

(72) Inventors: Xiao bo Chen, NingDe (CN); Wei feng Chen, NingDe (CN); Qing feng Yuan, NingDe (CN); Ping hua Deng, NingDe (CN); Quan kun Li, NingDe (CN); Xue hui Wang, NingDe (CN); Wei zhong Wu, NingDe (CN)

(73) Assignees: Ningde Amperex Technology Limited, NingDe (CN); Dongguan Amperex Technology Limited, Dongguan (CN)

(*) Notice: Subject to any disclaimer, the term of this patent is extended or adjusted under 35 U.S.C. 154(b) by 0 days.

(21) Appl. No.: 14/486,564

(22) Filed: Sep. 15, 2014

(65) Prior Publication Data

US 2015/0079426 A1    Mar. 19, 2015

(30) Foreign Application Priority Data

Sep. 15, 2013 (CN) .......................... 2013 1 0419888

(51) Int. Cl.
*H01M 2/12* (2006.01)
*H01M 10/0525* (2010.01)
*H01M 2/10* (2006.01)

(52) U.S. Cl.
CPC .......... *H01M 2/127* (2013.01); *H01M 2/1016* (2013.01); *H01M 2/1211* (2013.01); *H01M 2/1235* (2013.01); *H01M 10/0525* (2013.01); *H01M 2200/20* (2013.01); *Y02T 10/7011* (2013.01)

(58) Field of Classification Search
CPC ......... H01M 10/0525; H01M 2200/20; H01M 2/1016; H01M 2/1211; H01M 2/1235; H01M 2/127; Y02E 60/122; Y02T 10/7011

See application file for complete search history.

(56) References Cited

U.S. PATENT DOCUMENTS 8,034,479 B2   10/2011   Hong et al.
8,697,274 B2   4/2014    Geng et al.
(Continued)

FOREIGN PATENT DOCUMENTS

JP    2009-134986 A    6/2009

*Primary Examiner* — Patrick Ryan
*Assistant Examiner* — Ben Lewis
(74) *Attorney, Agent, or Firm* — Alston & Bird LLP (57) ABSTRACT

Provided is a lithium ion battery including a battery can, a battery core received in the battery can, electrolyte filled in the battery can, and a battery cover assembled to the battery can. The battery can or the battery cover is provided with a pressure relief valve, and the pressure relief valve is coupled with a mesh cover defining a number of through holes therein. According to the present invention, when thermal runaway occurs to the lithium ion battery, the pressure relief valve breaks timely. Only gases and electrolyte vapor can pass through the mesh cover. Solid particles cannot pass through the mesh cover. Therefore, ignition of the flammable gases, the electrolyte vapor and the high temperature solid particles in the surrounding air afar from the pressure relief valve is avoided and the safety performance of the lithium ion battery can be improved remarkably.

15 Claims, 5 Drawing Sheets (56) References Cited

U.S. PATENT DOCUMENTS

| | | |
|---|---|---|
| 2002/0039679 A1 | 4/2002 | Akita et al. |
| 2007/0054190 A1 | 3/2007 | Fukui et al. |
| 2010/0081052 A1 | 4/2010 | Morishima et al. |
| 2010/0285370 A1 | 11/2010 | Xia et al. |
| 2010/0304270 A1 | 12/2010 | Amin-Sanayei et al. |
| 2010/0310926 A1 | 12/2010 | Wang et al. |
| 2012/0028089 A1* | 2/2012 | Mustakallio ........ H01M 2/1022 429/53 |
| 2012/0237811 A1 | 9/2012 | Xia et al. |
| 2013/0171483 A1* | 7/2013 | Shibata ................. H01M 2/12 429/56 |
| 2014/0023890 A1* | 1/2014 | Okutani ................ H01M 2/024 429/53 |

* cited by examiner

LITHIUM ION BATTERY HAVING DESIRABLE SAFETY PERFORMANCE

CROSS-REFERENCE TO RELATED APPLICATIONS

The present patent application claims priority to Chinese Patent Application No. CN 201310419888.8 filed Sep. 15, 2013, which is incorporated by reference herein in its entirety.

BACKGROUND

Technical Field

The present application generally relates to lithium ion batteries and, more particularly, relates to a lithium ion battery and a lithium ion battery pack having desirable safety performance.

Description of Related Art

At present, lithium ion batteries are becoming increasingly popular in electric vehicles and electricity grid energy storage equipment. Due to various kinds of safety accidents relating to lithium ion batteries, more and more attention has been paid to the safety performance of the lithium ion batteries in recent years.

Safety accidents of lithium ion batteries are generally caused by thermal runaway. Due to the raise of temperature, various reactions occur in a lithium ion battery, such as decomposition of SEI, reduction reaction between the positive electrode and the electrolyte, oxidation reaction between the negative electrode and the electrolyte, and evaporation and decomposition of the electrolyte. Various kinds of reactions will induce continuous raise of temperature and generation of massive gases in the lithium ion battery, which may lead to sharp raise of pressure in the lithium ion battery.

To avoid explosion of lithium ion battery due to sharp pressure increase, a lithium ion battery is equipped with a pressure relief valve. When the lithium ion battery is charged improperly, or short circuited or exposed to high temperature, the pressure in the lithium ion battery will increase sharply and the pressure relief valve will break to release the pressure, so as to improve the safety performance of the lithium ion battery.

However, a conventional lithium ion battery has the following shortages. When thermal runaway occurs, the temperature in the lithium ion battery is generally higher than 400° C. At this temperature, active materials in the positive electrode and the negative electrode will react with the electrolyte and massive gases are generated, including combustible gases and non-combustible gases. At the same time, combustible electrolyte vapor is also generated. Mixture of the gases and the vapor carrying the high temperature solid particles will spurt out rapidly via the pressure relief valve. The mixture of the combustible gases, the combustible electrolyte vapor and the high temperature solid particles will ignite in the surrounding air, which may eventually lead to the ignition of the lithium ion battery.

The prior art also discloses a lithium ion battery pack. The lithium ion battery pack includes at least one lithium ion battery and a housing for receiving the at least one lithium ion battery. The housing defines a vent hole for communicating the inner side and the outer side of the lithium ion battery. The vent hole is coupled with a metal mesh. When the flame carrying the high temperature materials and the gases spurts out, heat of the flame and the high temperature materials is absorbed by the metal mesh quickly. The gases or the combustible materials are discharged out of the lithium ion battery pack. The flame will not be vented onto the outside of the housing.

The lithium ion battery pack as previously discussed is generally used in portable electronic devices. Each lithium ion battery in the lithium ion battery pack generally has low capacity and low charge and discharge power. However, a lithium ion battery used in electronic vehicles and electrical grid energy storage equipment generally has much higher capacity and higher charge and discharge power than that of a lithium ion battery used in portable electronic devices. When thermal runaway occurs, the heat generated by a lithium ion battery used in electronic vehicles and electrical grid energy storage equipment is much more than the heat generated by a lithium ion battery used in portable electronic devices, which will inevitably lead to the following disadvantages.

Firstly, the chamber between the housing and the lithium ion batteries is in communication with the surrounding air via the vent hole coupled with the metal mesh. There is also air in the chamber. When thermal runaway occurs to the lithium ion battery, the flammable materials and high temperature materials spurted out from the lithium ion battery will mix with the air in the chamber. The combustible gases will be ignited and burn vigorously in the confined space of the chamber, which will adversely affect the safety performance of the lithium ion battery.

Secondly, the housing is arranged at outside of the lithium ion batteries. When thermal runaway occurs to one of the lithium ion batteries, especially occurs to a lithium ion battery afar from the vent hole, the materials spurted out may pollute other lithium ion batteries in the same lithium ion battery pack or the circuit for connecting the lithium ion batteries, and further induce thermal runaway of all of the lithium ion batteries in the lithium ion battery pack. In addition, the housing will hinder the heat exchange between the lithium ion batteries and the surrounding air and lead to heat accumulation, which will adversely affect the safety performance of the lithium ion battery pack.

Thirdly, although the metal mesh covering the vent hole can prevent the flame from spraying onto the outside of the housing, the metal mesh can absorb and dissipate only portion of the heat. For a lithium ion battery which may generate a large amount of heat used in electronic vehicles, if the heat which fails to be dissipated by the metal mesh accumulates continuously, the flame may pass through the metal mesh and continue to burn.

In view of the foregoing, what is needed, therefore, is to provide a lithium ion battery and a lithium ion battery pack which has desirable safety performance.

BRIEF SUMMARY

One exemplary object of the present invention is to provide a lithium ion battery and a lithium ion battery pack having desirable safety performance.

According to one embodiment of the present invention, a lithium ion battery includes a battery can, a battery core received in the battery can, an electrolyte filled in the battery can, and a battery cover hermetically assembled to the battery can. The battery can or the battery cover is formed with a pressure relief valve, and the pressure relief valve is coupled with a mesh cover defining a number of through holes therein.

According to one aspect of the present invention, the mesh cover is coupled to the pressure relief valve from an inner side of the lithium ion battery. The mesh cover can be close to the pressure relief valve. In this case, the mesh cover shall not affect upward rupture of the pressure relief valve. Or, the mesh cover and the pressure relief valve can jointly enclose a chamber. In this case, the chamber contains inert gases and electrolyte vapor, does not contain air.

According to one aspect of the present invention, the mesh cover is coupled to the pressure relief valve from an outer side of the lithium ion battery, and the pressure relief valve and the mesh cover jointly defines a chamber therebetween.

According to one aspect of the present invention, the mesh cover is directly welded to the pressure relief valve, or is hermetically coupled to the pressure relief valve after being assembled to the battery cover or the battery can. The mesh cover can be hermetically coupled to the pressure relief valve via threaded connection, swage connection, clamp connection, welded connection or bonding connection and, preferably, welded connection.

According to one aspect of the present invention, the chamber has a volume of 0.3~5 mm3. If the chamber is too large, the staff spurted out via the pressure relief valve will accumulate in the chamber, the air in the chamber cannot be discharged quickly, which may lead to ephemeral incomplete combustion in the chamber. Size and shape of the chamber can be properly configured to control the speed of the gases and the electrolyte vapor spurted out via the through holes of the mesh cover, to prevent the flammable gases and the electrolyte vapor sprayed into the chamber from contacting the positive terminal and/or the negative terminal formed on the battery cover and igniting.

According to one aspect of the present invention, the mesh cover is formed with a lower portion, a middle portion extending obliquely and upwardly from the lower portion, and an upper portion defining a number of through holes therein at the top of the middle portion, and the lower portion is coupled to the battery can or the battery cover or the pressure relief valve and seals the same. The through holes defined in the mesh cover extend along a direction perpendicular to the battery can, so that the gases and the electrolyte vapor spurted out keep afar from the high temperature positive and/or negative terminal and do not ignite. In this case, the middle portion and the lower portion have no through holes defined there-through. The lower portion is hermetically couple to the pressure relief valve, or the battery cover, or the battery can.

According to one aspect of the present invention, ratio of an area of the upper portion of the mesh cover to an area of the pressure relief valve is 0.5~3. If the ratio of the area of the upper portion to the area of the pressure relief valve is less than 0.5, the air discharging efficiency of the mesh cover is too low, the gases generated in the runaway of the lithium ion battery cannot be discharged timely, which may lead to sharp increase of pressure in the lithium ion battery and even explosion of the lithium ion battery. If the ratio of the area of the upper portion to the area of the pressure relief valve is more than 3, the included angle of the middle portion of the mesh cover and the battery cover or the battery can is too small, the filtered staff may deposit on and block the pressure relief valve when runaway occurs to the lithium ion battery, which may lead to sharp increase of pressure in the lithium ion battery and even explosion of the lithium ion battery.

According to one aspect of the present invention, the upper portion of the mesh cover has a porosity of 20%~85%. If the porosity of the upper portion is less than 20%, the gases and the electrolyte vapor generated during runaway of the lithium ion battery cannot be discharged timely, which may lead to sharp increase of pressure in the lithium ion battery and even explosion of the lithium ion battery. If the porosity of the upper portion is too small, speed of the gases and the electrolyte vapor spurted out from the mesh cover will reduce and can be readily diluted by the surrounding air, which may lead to the flammable area formed by the gases and the electrolyte vapor spurted out even closer to the mesh cover and adversely affect the safety performance of the lithium ion battery. If the porosity of the upper portion is more than 85%, metal connection portions between the through holes become very weak. When runaway occurs to the lithium ion battery, the mesh cover may be broken and cannot separate the high temperature solid particles.

According to one aspect of the present invention, the mesh cover has a thickness of no less than 50 μm. If the thickness of the mesh cover is too small, the compressive strength of the mesh cover is unsatisfying. When runaway occurs to the lithium ion battery, the mesh cover may be broken and cannot separate the high temperature solid particles.

According to one aspect of the present invention, each through hole in the mesh cover has a sectional area of 0.01~50 mm2. If the through hole is too small, the flow of the gases and the electrolyte vapor spurted out from the through hole within a predetermined time will reduce and be readily diluted by the surrounding air, which may lead to the flammable area formed by the gases and the electrolyte vapor spurted out even closer to the mesh cover and adversely affect the safety performance of the lithium ion battery. If the through hole is too large, the mesh cover cannot effectively separate the high temperature solid particles.

According to one aspect of the present invention, the mesh cover is coated with flame retardant material and/or insulating material selected from a group consisting of phenolic resin, Teflon, polyurethane and inorganic compound.

According to one aspect of the present invention, the pressure relief valve is formed with one layer, two layers or more layers of mesh cover defining a plurality of through holes therein.

According to one aspect of the present invention, the mesh cover is made from metal material or inorganic nonmetal ceramic material. Metal material or inorganic nonmetal ceramic material can withstand high temperature, is difficult to crack, and does not adsorb or absorb electrolyte vapor. Therefore, electrolyte vapor can easily pass through the mesh cover. If the electrolyte vapor is adsorbed or absorbed by the mesh cover, the electrolyte vapor may mix with the filtered solid particles and block the mesh cover. The speed of the gases and the electrolyte vapor passing through the mesh cover is reduced and flammable area formed by the gases and the electrolyte vapor after spurting out from the mesh cover will be even closer to the mesh cover, which may adversely affect the safety performance of the lithium ion battery. Preferably, the mesh cover is made from metal material. Metal material has desirable heat absorbing performance and heat dissipating performance. The heat can be timely dissipated to the surroundings. Consequently, safety problem due to the accumulation of heat is avoided. More preferably, the mesh cover is made from one of aluminum, aluminum alloy, nickel, nickel alloy and stainless steel. In addition, the mesh cover is preferably made from a same material as that of the battery cover or the battery can. Electrical potential difference exists between different metals. Different metal materials may form an electrolytic cell with the surrounding air or the electrolyte, which may induce corrosion reaction and further adversely affect the safety performance of the lithium ion battery.

According to one aspect of the present invention, the compressive strength of the pressure relief valve is about 0.2~1.0 MPa.

According to one aspect of the present invention, the battery cover defines a pressure relief hole and a positive terminal and a negative terminal at two sides of the pressure relief hole. The pressure relief valve is a pressure relief plate hermetically seated on the pressure relief hole. The pressure relief plate is preferably made from metal material. The metal material has desirable ductility and will not fly off after rupture. Preferably, the pressure relief plate, the battery cover and the battery can are made from same kind of metal material. Electrical potential difference exists between different metal materials. Different metal materials may form an electrolytic cell with the surrounding air or the electrolyte, which may induce corrosion reaction and adversely affect the safety performance of the lithium ion battery. In addition, the metal plate is coated or bonded with a layer of corrosion resistant material, such as PE and/or PP, to prevent the pressure relief plate being corroded by the electrolyte. According to one aspect of the present invention, the pressure relief plate is provided with a thinned line or a thinned area. When the pressure in the lithium ion battery exceeds a predetermined value, the pressure relief plate will first break at the thinned line or the thinned area, so as to control the rupture position of the pressure relief plate.

According to one aspect of the present invention, the height of the mesh cover is less than twice as the height of the positive terminal and the negative terminal or twice as the maximum distance between any two points on the pressure relief plate, and no less than one fourth of the minimum distance between any two points on the pressure relief plate. If the mesh cover is too high, the energy density of the lithium ion battery will be reduced. If the mesh cover is too low, there will be no adequate space for allowing the rupture of the pressure relief plate.

The inventors of the present invention surprisingly find that, the mixture of the gases, vapor and high temperature solid particles generated during thermal runaway of the lithium ion battery will form two areas, i.e. safe area and flammable area. The safe area is close to the pressure relief valve. In the safe area, the mixture spurted out is concentrated and flow quickly. Surrounding air is difficult to mix with the mixture of the gases, vapor and high temperature solid particles. Therefore, in the safe area, the mixture of the gases, vapor and high temperature solid particles is difficult to ignite. The flammable area is afar from the pressure relief valve, the mixture of the gases, vapors and high temperature solid particles will decelerate and mix with the surrounding air quickly. Therefore, in the flammable area, mixture of the combustible gases, the electrolyte vapor and the high temperature solid particles will contact with the surrounding air and ignite.

According to the embodiments of the present invention, the pressure relief valve of the lithium ion battery does not break in normal manufacture and use. When thermal runaway occurs to the lithium ion battery, the pressure relief valve will break timely. The mesh cover only allows the pass of the gases and the vapor. The solid particles cannot pass through the mesh cover. Therefore, the high temperature solid particles can be separated from the high speed flammable gases and the electrolyte vapor. Therefore, ignition of the flammable gases, the electrolyte vapor and the high temperature solid particles in the surrounding air afar from the pressure relief plate can be avoided and the safety performance of the lithium ion battery can be improved remarkably.

According to one embodiment of the present invention, a lithium ion battery pack is provided. The lithium ion battery pack includes a number of lithium ion batteries each having a pressure relief valve connected in serial or in parallel, a guiding cover defining an exhaust port and a number of mounting holes hermetically mounted on corresponding pressure relief valves of the lithium ion batteries, and a mesh cover defining a number of through holes hermetically coupled to the exhaust port.

According to one aspect of the present invention, the mesh cover comprises a lower portion fixed to the guiding cover and hermetically coupled to the exhaust port, a middle portion extending upwardly from the lower portion, and an upper portion defining a plurality of through holes at a top of the middle portion.

According to the embodiments of the present invention, the lithium ion battery pack does not need to dispose a can enclosing the lithium ion battery at an outer side thereof and, therefore, can ensure heat exchange efficiency between the lithium ion batteries and the surrounding air and improve the safety performance of the lithium ion battery pack. In addition, even though thermal runaway occurs to one or more lithium ion batteries in the pack, the flammable material spurted out does not contact the terminals of other lithium ion batteries or the circuit connecting the lithium ion batteries. Therefore, thermal runaway does not occur to the whole lithium ion battery pack and other lithium ion batteries in the pack will not be polluted.

Other advantages and novel features will be drawn from the following detailed description of preferred embodiments with the attached drawings. The accompanying drawings, which are incorporated in and constitute a part of this specification, illustrate embodiments of the present invention and, together with a general description of the invention given above, and the detailed description of the embodiments given below, serve to explain the principles of the invention:

DETAILED DESCRIPTION OF VARIOUS EMBODIMENTS

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

Referring to FIGS. 1 to 4, a lithium ion battery according to a first embodiment of the present invention includes a battery can 10, a battery core 20 suitably received in the battery can 10, electrolyte filled in the battery can 10, and a battery cover 30 hermetically coupled to the battery can 10. The battery cover 30 is provided with a positive terminal and a negative terminal 302. The positive terminal and the negative terminal 302 are electrically connected to a corresponding positive electrode and a negative electrode of the battery core 20 via a conductive connector 40, respectively.

The battery cover 30 is provided with a pressure relief hole 304 seated between the positive terminal and the negative terminal 302. The pressure relief hole 304 is sealed by a pressure relief plate 50. The pressure relief plate 50 is equipped with a mesh cover 60 defining a number of through holes 608. The mesh cover 60 has a height less than two times of the height of the positive terminal and negative terminal 302 or maximum distance between any two points on the pressure relief plate 50, and no less than ¼ of the minimum distance between any two points on the pressure relief plate 50. If the mesh cover 60 is too high, the volume of the lithium ion battery will increase, which will inevitably reduce the energy density of the lithium ion battery. If the mesh cover 60 is too low, there will be no adequate space for receiving the deformed pressure relief plate 50.

Figure 1:
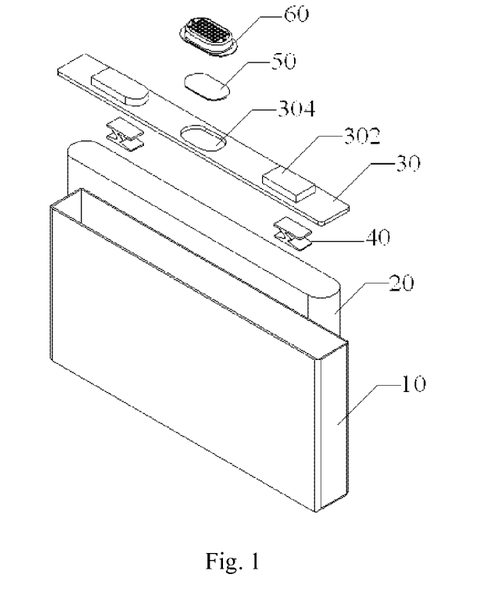
FIG. 1 depicts an exploded view of a lithium ion battery according to a first embodiment of the present invention, wherein a mesh cover is disposed on an outer surface of a battery cover of the lithium ion battery.
Figure 2:
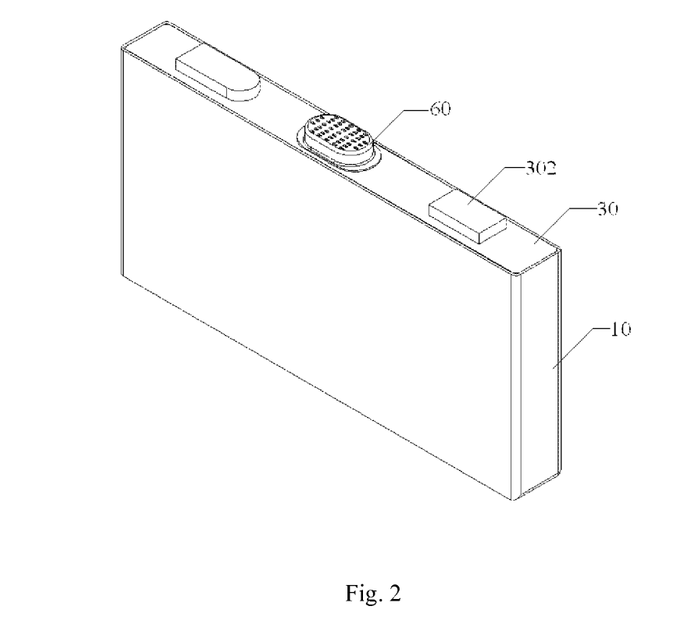
FIG. 2 depicts an assembled view of the lithium ion battery as shown in FIG. 1.

The pressure relief plate 50 and the battery cover 30 are made from same kind of metal material, so as to reduce corrosion of the lithium ion battery due to electrical potential difference between different metals. In the embodiment as illustrated, the pressure relief plate 50 is made from aluminum, aluminum alloy, nickel, nickel ally, or stainless steel. The pressure relief plate 50 has desirable ductility and will not dash off after rupture. According to one embodiment of the present invention, the pressure relief plate 50 is coated with a layer of corrosion resistant material, such as PE and/or PP, so as to prevent the pressure relief plate 50 from being corroded by the electrolyte. According to another embodiment of the present invention, the pressure relief plate 50 is provided with a weakened area or weakened line which can break when the pressure in the lithium ion battery exceeds a predetermined value, so that the rupture position of the pressure relief plate 50 can be limited to a predetermined area. According to one preferable embodiment of the present invention, the pressure relief plate 50 can bear a pressure of 0.2~1.0 MPa.

Figure 3:
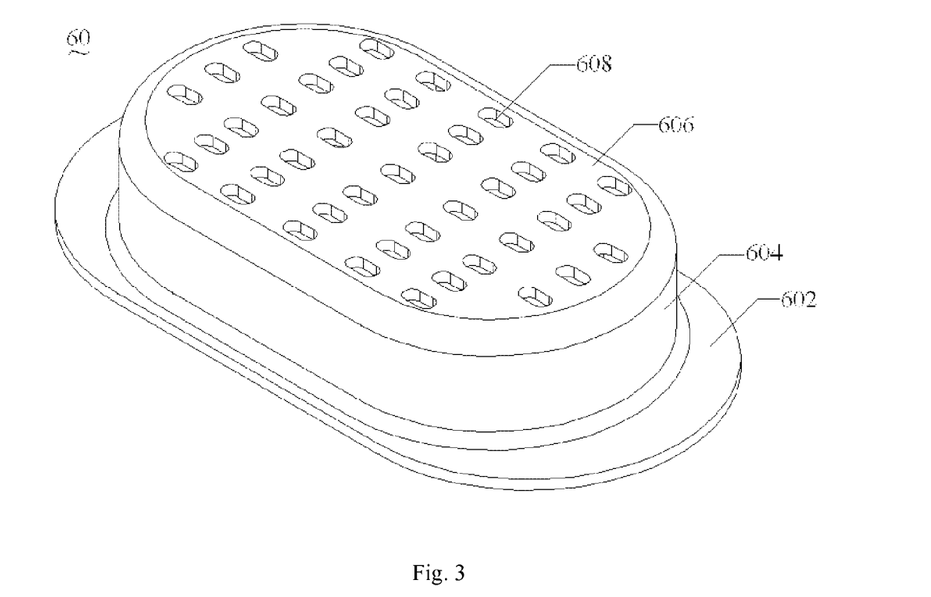
FIG. 3 depicts a perspective view of the mesh cover as shown in FIG. 1.
Figure 4:
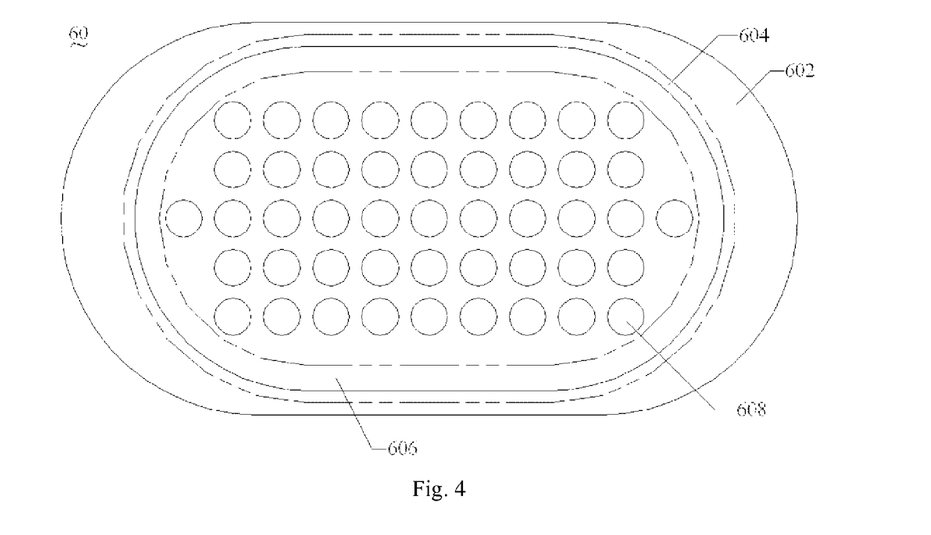
FIG. 4 depicts a top view of the mesh cover as shown in FIG. 3.

Referring to FIGS. 3 and 4, the battery cover 30 is coupled with a mesh cover 60. The mesh cover 60 seals the pressure relief plate 50 and has a thickness of no less than 50 μm. If the mesh cover 60 is too thin, the mesh cover 60 cannot bear high pressure. When runaway occurs to the lithium ion battery, the mesh cover 60 may be broken through and cannot separate the high temperature solid particles. The mesh cover 60 and the battery cover 30 are preferably made from same kind of material, such as aluminum, aluminum alloy, nickel, nickel ally, or stainless steel. The mesh cover 60 is preferably coated with flame retardant and/or electrical insulating material, such as phenolic resin, Teflon, polyurethane or inorganic compound.

Referring particularly to FIGS. 3 and 4, the mesh cover 60 is a hemi-ellipsoidal hollow cover. The mesh cover 60 includes a lower portion 602, a middle portion 604 extending obliquely and upwardly from the lower portion 602, and an upper portion 606 seated at the top of the middle portion 604. The lower portion 602 is fixed to the battery cover 30 and seals the pressure relief plate 50. The mesh cover 60 and the pressure relief plate 50 jointly enclose a chamber having a volume of 0.3~5 mm3. The lower portion 602 and the battery cover 30 can be coupled to each other via threaded connection, swage connection, clamp connection, welded connection and bonding connection, and preferably via welded connection.

The upper portion 606 of the mesh cover 60 defines a number of through holes 608. The gas and the vapor can pass through the through holes 608, while the solid particles cannot pass through the through holes 608. Each through hole 608 has a shape of circle, ellipse or square and has a sectional area of 0.1~5 mm2. In the embodiment as illustrated, the upper portion 606 of the mesh cover 60 has a porosity of 20%~85%. If the porosity is less than 20%, the gas and the electrolyte vapor cannot be discharged timely, which may lead to sharp increase of pressure in the lithium ion battery and further lead to explosion of the lithium ion battery. If the porosity is too small, speed of the gas and the electrolyte vapor passed through the mesh cover 60 will reduce and the gas and the electrolyte vapor will be readily diluted by the surrounding air, which will cause the flammable area formed by the gas and the electrolyte vapor after passing through the mesh cover 60 closer to the mesh cover 60 and further affect the safety performance of the lithium ion battery. If the porosity is more than 85%, connection portion between every two adjacent through holes 608 becomes very weak. When runaway occurs to the lithium ion battery is, the mesh cover 60 may be broken through and, therefore, the mesh cover 60 can not prevent the pass of the sparks.

In the illustrated embodiment, the lithium ion battery is formed with only one layer of mesh cover 60. However, according to other embodiments of the present invention, the lithium ion battery can also be formed with two or more layers of mesh cover 60. According to one preferable embodiment of the present invention, ratio of the area of the mesh cover 60 to the area of the pressure relief plate 50 is about 0.5 to 3. When the ratio of the area of the mesh cover 60 to the area of the pressure relief plate 50 is less than 0.5, exhaust efficiency of the mesh cover 60 is pretty low, the gas generated during runaway of the lithium ion battery cannot be discharged timely, which may lead to sharp increase of pressure in the lithium ion battery and even explosion of the lithium ion battery. When the ratio of the area of the mesh cover 60 to the area of the pressure relief plate 50 is more than 3, the included angle between the middle portion 604 of the mesh cover 60 and the battery cover 30 or the battery can 10 is very small. When runaway occurs to the lithium ion battery, the filtered materials may deposit on the middle portion 604 and block the pressure relief plate 50, which may lead to sharp increase of the pressure in the lithium ion battery and even explosion of the lithium ion battery.

In assembly, the pressure relief plate 50 is assembled to the pressure relief hole 304 for sealing the same. The lower portion 602 of the mesh cover 60 is welded on the outer surface of the battery cover 30. The mesh cover 60 covers the pressure relief plate 50. A chamber having a volume of 0.3~5 mm3 is jointly enclosed by the mesh cover 60 and the pressure relief plate 50. The battery core 20 and the conductive connector 40 are assembled in the battery can 10 in turn. The battery cover 30 equipped with the pressure relief plate 50 and the mesh cover 60 is assembled to the battery can 10. In the assembled lithium ion battery, the mesh cover 60 is located at the outer surface of the battery cover 30.

During the safety test, temperate in the lithium ion battery rises sharply and massive gas is generated in the lithium ion battery. The pressure relief plate 50 breaks and reverses to discharge the gas carrying sparks from the lithium ion battery. Due to the arrangement of the mesh cover 60 over the pressure relief plate 50, when the gas passing through the mesh cover 60, the solid sparks will be filtered and only gas can pass through the mesh cover 60. Therefore, high temperature solid particles can be separated from the high speed flammable gas and the electrolyte vapor, which can prevent the high temperature solid particles from being blown out together with the flammable gas and the electrolyte vapor and mixing with the air surrounding the pressure relief plate 50 and burning. Filter of the solid sparks can change the possible ignition mode of the lithium ion battery from being ignited by the sparks to igniting of the gas. The temperature for the gas being ignited is generally less than 60° C., while the temperature for igniting the gas is generally higher than 450° C. Therefore, the safety performance of the lithium ion battery can be improved remarkably.

Figure 5:
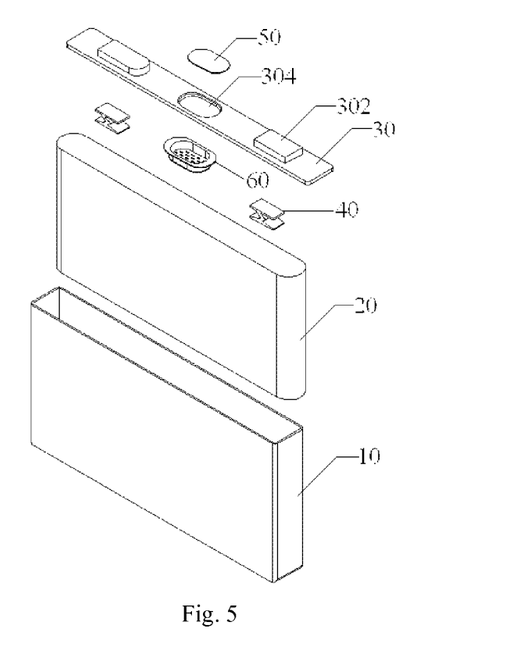
FIG. 5 depicts an exploded view of a lithium ion battery according to a second embodiment of the present invention, wherein a mesh cover is disposed on an inner surface of a battery cover of the lithium ion battery.

FIG. 5 illustrates a second embodiment of the lithium ion battery according to the present invention. In the second embodiment of the lithium ion battery according to the present invention, instead of being arranged on the outer surface of the battery cover 30 as illustrated in the first embodiment of the present invention, the mesh cover 60 is arranged on the inner surface of the battery cover 30 and sealing the pressure relief plate 50. After assembly of the lithium ion battery, the mesh cover 60 is seated within the battery can 10. In this case, the mesh cover 60 can be configured to be seated against the pressure relief plate 50, or can be configured to separate from the pressure relief plate 50 with a chamber defined there-between. Also, in this case, the size of the battery core 20 and the battery can 10 is needed to change, so as to provide adequate space to accommodate the mesh cover 60.

Figure 6:
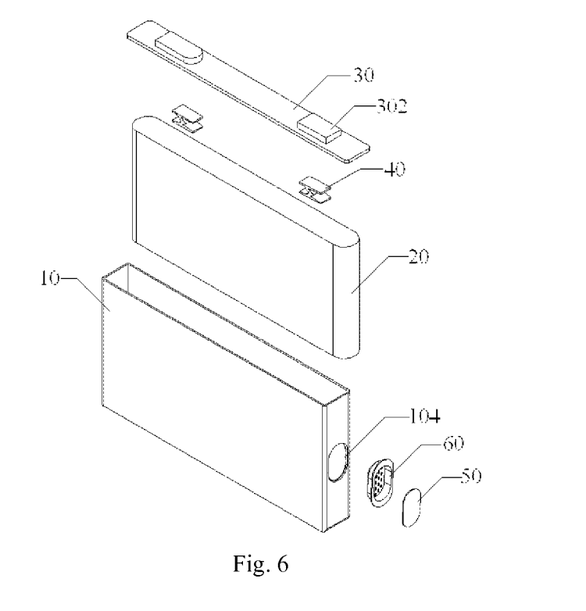
FIG. 6 depicts an exploded view of a lithium ion battery according to a third embodiment of the present invention, wherein a mesh cover is disposed on an inner surface of a sidewall of a battery can of the lithium ion battery.
Figure 7:
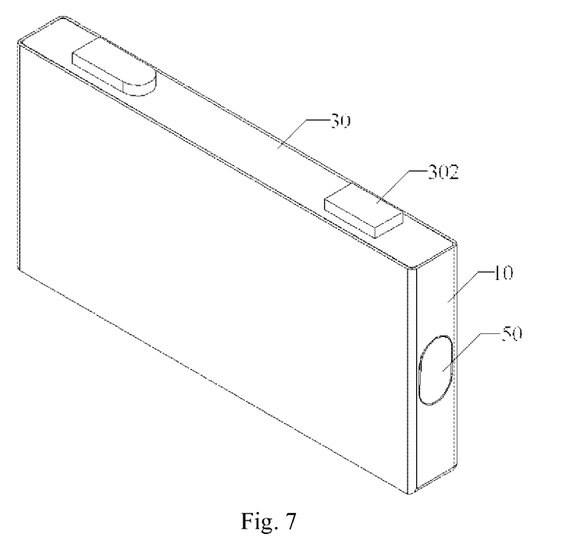
FIG. 7 depicts an assembled view of the lithium ion battery according to the third embodiment of the present invention.

FIGS. 6 and 7 illustrate a third embodiment of the lithium ion battery according to the present invention. In the third embodiment of the lithium ion battery according to the present invention, instead of being arranged on the inner surface of the battery cover 30 as illustrated in the second embodiment of the present invention, the mesh cover 60 is disposed on the inner surface of a sidewall of the battery can 10. Also, in this case, the size of the battery core 20 and the battery can 10 is needed to change, so as to provide adequate space to accommodate the mesh cover 60.

Figure 8:
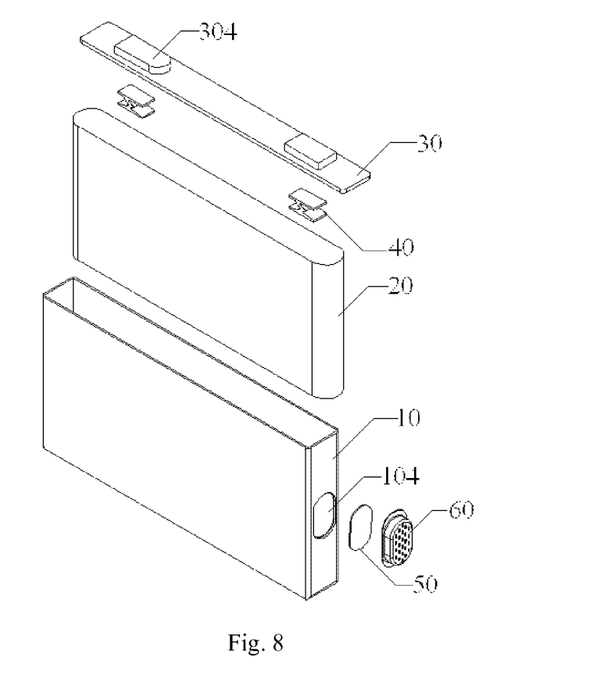
FIG. 8 depicts an exploded perspective view of a lithium ion battery according to a fourth embodiment of the present invention, wherein a mesh cover is disposed on an outer surface of a sidewall of a battery can of the lithium ion battery.
Figure 9:
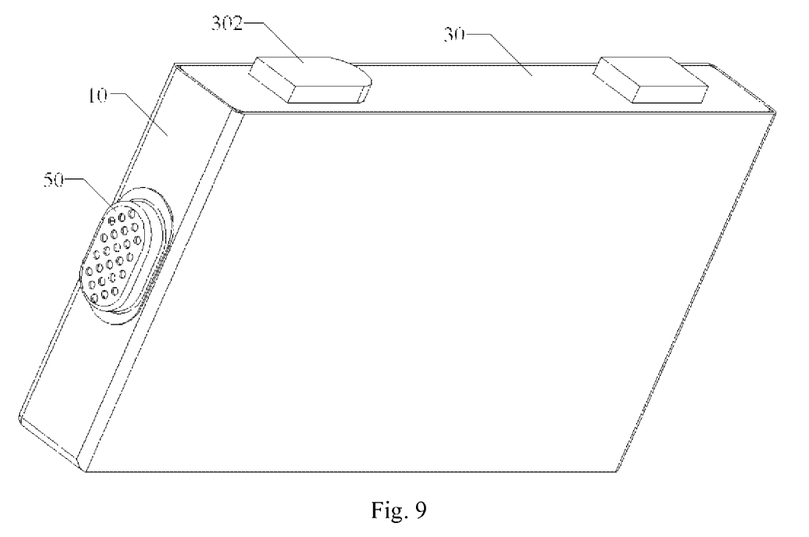
FIG. 9 depicts an assembled view of the lithium ion battery according to the fourth embodiment of the present invention.

FIGS. 8 and 9 illustrate a fourth embodiment of the lithium ion battery according to the present invention. In the fourth embodiment of the lithium ion battery according to the present invention, instead of being arranged on the inner surface of a sidewall of the battery can 10, the mesh cover 60 is disposed on an outer surface of a sidewall of the battery can 10.

According to the embodiments of the present invention, the pressure relief plate 50 of the lithium ion battery does not break in normal manufacture and use. When runaway occurs to the lithium ion battery, the pressure relief plate 50 will break timely. The mesh cover 60 only allows the pass of the gas and the electrolyte vapor. The solid particles cannot pass through the mesh cover 60. Therefore, the high temperature solid particles can be separated from the high speed flammable gas and the electrolyte vapor. Therefore, ignition of the flammable gas, the electrolyte vapor and the high temperature solid particles in the surrounding air afar from the pressure relief plate 50 can be avoided and the safety performance of the lithium ion battery can be improved remarkably.

Figure 10:
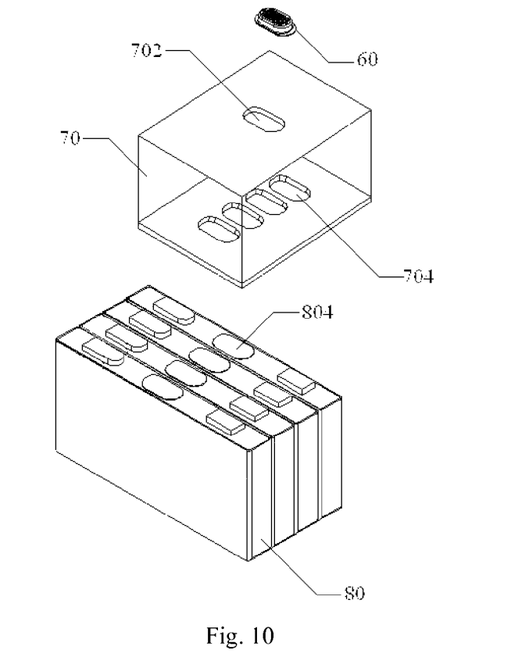
FIG. 10 depicts perspective view of a lithium ion battery pack according to one embodiment of the present invention.

FIG. 10 illustrates a lithium ion battery pack according to one embodiment of the present invention. The lithium ion battery pack includes a number of lithium ion batteries 80 each having a pressure-relief plate 804 being connected in serial or in parallel, a guiding cover 70 defining a number of mounting holes 704 registering with corresponding pressure relief plates 804 at an upper wall thereof and an exhaust port 702 at a lower wall thereof hermetically assembled to the lithium ion batteries 80, and a mesh cover 60 coupled to the guiding cover 70. The mesh cover 60 includes a lower portion, a middle portion extending upwardly and obliquely from the lower portion, and an upper portion defining a number of through holes at the top of the middle portion. The lower portion is hermetically fixed to the upper surface of the guiding cover 70 and covers the exhaust port 702.

In the embodiment of the lithium ion battery pack as illustrated in FIG. 10, each lithium ion battery 80 can be a lithium ion battery as previously described in the embodiments of the present invention, each lithium ion battery 80 is provided with a pressure-relief plate 804.

The guiding cover 70 defines an exhaust port 702 at an upper wall thereof and a number of mounting holes 704 corresponding to the pressure-relief plates 804 of the lithium ion batteries 80 at a lower wall thereof. Each mounting hole 704 has a shape and size corresponding to that of a corresponding pressure-relief plate 804.

In assembly, the lithium ion batteries 80 are connected in serial or in parallel to form a lithium ion battery pack. The guiding cover 70 is coupled to the lithium ion battery pack with the mounting holes 704 hermetically coupled to the corresponding pressure relief plates 804, so that after fracture of the pressure relief plate 804, mixture of the high speed flammable gas, the electrolyte vapor and the high temperature solid particles can only blow out into the chamber of the guiding cover 70. The mesh cover 60 is coupled to the exhaust port 702 in the guiding cover 70 in a similar manner as in the embodiments as previously described.

When runaway occurs to one or more lithium ion batteries 80 in the lithium ion battery pack, the pressure relief plates 804 break timely. Mixture of the flammable gases, the electrolyte vapor and the high temperature solid particles blows out into the chamber of the guiding cover 70. Because the mounting holes 704 of the guiding cover 70 are hermetically assembled to the corresponding pressure relief plates 804, mixture of the flammable gas, the electrolyte vapor and the high temperature solid particles only can blow out into the chamber of the guiding cover 70 and further enters the surrounding air via the mesh member 60. In view of the foregoing, the high temperature solid particles are prevented from being blown out into the surrounding air together with the flammable gas and the electrolyte vapor. The mixture being blown out cannot ignite in the surrounding air and, therefore, safety performance of the lithium ion battery pack is improved remarkably.

It should be noticed that, in the embodiment as illustrated, the lithium ion battery is a cubic lithium ion battery. However, it should be understood that, the lithium ion battery can also be a cylindrical lithium ion battery or a prismatic lithium ion battery. In addition, although pressure relief plate is used to explain the spirit of the present invention, the mesh cover according to the present invention can also be equipped to other relief valves of the lithium ion battery.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments, it should be appreciated that alternative embodiments without departing from the scope of the appended claims. Although specific terms are employed herein, they are used in a generic and descriptive sense only and not for purposes of limitation.

That which is claimed:

1. A lithium ion battery, comprising:
a battery can;
a battery core received in the battery can;
an electrolyte filled in the battery can; and
a battery cover hermetically assembled to the battery can, wherein:
the battery can or the battery cover is provided with a pressure relief valve;
the pressure relief valve is coupled with a mesh cover defining a plurality of through holes therein; and
each through hole define in the mesh cover has a sectional area of 0.01~50 mm².

2. The lithium ion battery of claim 1, wherein:
the mesh cover is coupled to the pressure relief valve from an inner side of the lithium ion battery; and
the mesh cover is at least one of close to the pressure relief valve or is apart from the pressure relief valve to define a chamber between the pressure relief valve and the mesh cover.

3. The lithium ion battery of claim 2, wherein the chamber has a volume of 0.3~5 mm³.

4. The lithium ion battery of claim 1, wherein:
the mesh cover is coupled to the pressure relief valve from an outer side of the lithium ion battery; and
the pressure relief valve and the mesh cover cooperatively defines a chamber there-between.

5. The lithium ion battery of claim 1, wherein:
the mesh cover is formed with a lower portion, a middle portion extending upwardly from the lower portion, and an upper portion defining a plurality of through holes therein at a top of the middle portion; and
the lower portion is coupled to at least one of the battery can or the battery cover or the pressure relief valve and seals the same.

6. The lithium ion battery of claim 5, wherein ratio of an area of the upper portion of the mesh cover to an area of the pressure relief valve is 0.5~3.

7. The lithium ion battery of claim 5, wherein the upper portion of the mesh cover has a porosity of 20%~85%.

8. The lithium ion battery of claim 1, wherein the mesh cover has a thickness of no less than 50 μm.

9. The lithium ion battery of claim 1, wherein the mesh cover is formed with at least one of a flame retardant or an electrical insulating material, said material being selected from a group consisting of phenolic resin, Teflon, polyurethane, and inorganic compound.

10. The lithium ion battery of claim 1, wherein the pressure relief valve is formed with one layer, two or more layers of mesh cover defining through holes therein.

11. The lithium ion battery of claim 1, wherein the mesh cover is made from at least one of aluminum, aluminum alloy, nickel, nickel alloy, or stainless steel.

12. The lithium ion battery of claim 1, wherein:
the battery cover is provided with a pressure relief hole and a positive terminal and a negative terminal seated at two sides of the pressure relief hole; and
the pressure relief valve is a pressure relief plate hermetically coupled to the pressure relief hole.

13. The lithium ion battery of claim 12, wherein:
the mesh cover has a height at least one of less than twice as a height of the positive terminal and the negative terminal or less than twice as a maximum distance between any two points on the pressure relief plate; and
the mesh cover has a height no less than one fourth of a minimum distance between any two points on the pressure relief plate.

14. A lithium ion battery pack, said pack comprising:
a plurality of lithium ion batteries each having a pressure-relief valve connected in at least one of in serial or in parallel;
a guiding cover defining an exhaust port and a plurality of mounting holes hermetically mounted on corresponding pressure relief valves of the lithium ion batteries; and
a mesh cover defining a plurality of through holes hermetically coupled to the exhaust port.

15. The lithium ion battery pack of claim 14, wherein the mesh cover comprises a lower portion fixed to the guiding cover and hermetically coupled to the exhaust port, a middle portion extending upwardly from the lower portion, and an upper portion defining a plurality of through holes at a top of the middle portion.

* * * * *